United States Patent

Geck et al.

[11] Patent Number: 5,854,369
[45] Date of Patent: Dec. 29, 1998

[54] MONODISPERSE SOLUBLE ORGANOPOLYSILOXANE PARTICLES

[75] Inventors: Michael Geck; Bernward Deubzer, both of Burghausen; Manfred Schmidt, Bodenheim; Frank Baumann, Mehring, all of Germany

[73] Assignee: Wacker-Chemie GmbH, Germany

[21] Appl. No.: 638,060

[22] Filed: Apr. 25, 1996

[30] Foreign Application Priority Data

May 26, 1995 [DE] Germany .................. 195 19 446.2

[51] Int. Cl.[6] .................... C08G 77/38; C08G 77/22; C08G 77/14
[52] U.S. Cl. .................... 528/30; 528/33; 528/34
[58] Field of Search .................... 528/33, 30, 34

[56] References Cited

U.S. PATENT DOCUMENTS

| | | | |
|---|---|---|---|
| 4,424,297 | 1/1984 | Bey | 524/714 |
| 4,595,740 | 6/1986 | Panster | 528/30 |
| 4,690,986 | 9/1987 | Sasaki et al. | 525/479 |
| 4,935,484 | 6/1990 | Wolfgruber et al. | 528/34 |
| 5,049,636 | 9/1991 | Wolfgruber et al. | |
| 5,250,615 | 10/1993 | Yamamoto et al. | 525/63 |
| 5,385,988 | 1/1995 | Yamamoto et al. | 525/479 |
| 5,391,647 | 2/1995 | Yamamoto et al. | 525/479 |

FOREIGN PATENT DOCUMENTS

| | | |
|---|---|---|
| 2004297 | 2/1990 | Canada . |
| 2134766 | 11/1993 | Canada . |
| 0291939 | 11/1988 | European Pat. Off. . |
| 0326810 | 8/1989 | European Pat. Off. . |
| 0335414 | 10/1989 | European Pat. Off. . |
| 2639950 | 6/1990 | France . |
| 9323455 | 11/1993 | WIPO . |

OTHER PUBLICATIONS

"Simultaneous static and dynamic light scattering" by M. Schmidt, Dynamic Light Scattering, W. Brown (Editor) Oxford University Press, pp. 372–406 (1993).

"Microgels–Polymers with a Special Molecular Architecture" by M. Antonietti, Angew. Chem. 100 (1988) Nr. 12, pp. 1813–1816.

Database WPI, English Derwent Abstract AN 93–224366.
Database WPI, English Derwent Abstract AN 94–260609.

*Primary Examiner*—Donald R. Wilson
*Attorney, Agent, or Firm*—Brooks & Kushman P.C.

[57] ABSTRACT

The organopolysiloxane particles consist of a single molecule, are crosslinked and have an average diameter of 5 to 200 nm. At least 80% of the particles have a diameter which deviates from the average diameter by not more than 30%. The particles are soluble in a solvent to the extent of at least 5% by weight.

4 Claims, No Drawings

MONODISPERSE SOLUBLE ORGANOPOLYSILOXANE PARTICLES

FIELD OF INVENTION

The present invention relates to crosslinked monodisperse soluble organopolysiloxane particles which consist of a single molecule and have an average diameter of 5 to 200 nm, and to their preparation.

BACKGROUND OF INVENTION

Organopolysiloxane particles present in suspension which have an average diameter of 1 to 100 nm are described, in U.S. Pat. No. 4,424,297. After isolation as a powder, these particles are insoluble in all solvents, since the particles are crosslinked to larger agglomerates via reactive groups still present on the surfaces, such as silanol groups or alkoxy groups which are capable of condensation.

Monodisperse, or uniform sized particles are necessary for many applications. EP-A-326 810 describes monodisperse organopolysiloxane particles which have an average diameter of 800 to 5000 nm. These particles are prepared by slowly adding methyltrialkoxysilane dropwise to aqueous, dilute ammonia or amine solution. The powder which has precipitated out of the colloidal suspension is isolated and treated with a silylating agent. These particles are insoluble in all solvents.

SUMMARY OF INVENTION

The object of the present invention is to provide crosslinked organopolysiloxane particles which consist of a single molecule, have a monodisperse particle size distribution within a size range from 5 to 200 nm and are soluble in a solvent to the extent of at least 5% by weight.

The present invention relates to crosslinked organopolysiloxane particles which consist of a single molecule and have an average diameter of 5 to 200 nm, where at least 80% of the particles have a diameter which deviates from the average diameter by not more than 30%, and which are soluble in a solvent to the extent of at least 5% by weight.

The organopolysiloxane particles typically have an average molecular weight $M_w$ of at least $10^5$, in particular $5 \times 10^5$ to not more than $10^{10}$, in particular $10^9$. The average diameters of the organopolysiloxane particles preferably, are at least 10 and not more than 150 nm. Preferably, at least 80% of the particles have a diameter which deviates from the average diameter by not more than 20%, in particular not more than 10%. The preferred organopolysiloxane particles are spherical microgels.

The organopolysiloxane particles are crosslinked intramolecularly, but have no intermolecular crosslinking between the organopolysiloxane particles. The organopolysiloxane particles are readily soluble in solvents.

The solvent in which the organopolysiloxane particles dissolve to the extent of at least 5% by weight depends on the build-up of the organopolysiloxane particles, and in particular on the groups on the surface of the organopolysiloxane particles. For all organopolysiloxane particles there is a suitable solvent. Examples of such solvents are water; alcohols, such as methanol, ethanol, n-propanol or iso-propanol; ethers, such as dioxane, tetrahydrofuran, diethyl ether or diethylene glycol dimethyl ether; chlorinated hydrocarbons, such as methylene chloride, chloroform, carbon tetrachloride, 1,2-dichloroethane or trichloroethylene; hydrocarbons, such as pentane, n-hexane, cyclohexane, hexane isomer mixtures, heptane, octane, wash benzine, petroleum ether, benzene, toluene or xylenes; ketones, such as acetone, methyl ethyl ketone or methyl isobutyl ketone; dimethylformamide, carbon disulfide and nitrobenzene, or mixtures of these solvents, as well as monomers, such as methyl methacrylate or styrene, and polymers, such as liquid organopolysiloxanes.

The solubility of the organopolysiloxane particles can be determined, at 20° C. Suitable solvents are toluene for organopolysiloxane particles having hydrocarbon radicals, tetrahydrofuran for organopolysiloxane particles having amino radicals and water for organopolysiloxane particles having sulfonate radicals. Organopolysiloxane particles having hydrocarbon radicals have a virtually unlimited solubility in toluene and are soluble up to the extent of 15% by weight in liquid polydimethylsiloxane having a viscosity of 35 mPa.s at 25° C. The organopolysiloxane particles are soluble to the extent of at least 10% by weight, in particular to the extent of at least 15% by weight, in a solvent chosen from the group consisting of toluene, tetrahydrofuran and water.

The organopolysiloxane particles are built up from 0.5 to 80.0% by weight of units of the formula

           (1), 0 to 99.0% by weight of units of the formula

           (2), 0 to 99.5% by weight of units of the formula

           (3), 0 to 80.0% by weight of units of the formula

           (4) and 0 to 20.0% by weight of units of the formula

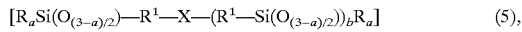           (5), in which

R is a hydrogen atom or identical or different monovalent, optionally substituted $C_1$- to $C_{18}$-hydrocarbon radicals, $R^1$ are identical or different divalent SiC-bonded, optionally substituted $C_1$- to $C_{18}$-hydrocarbon radicals, which can be interrupted by divalent radicals from the group consisting of —O—, —COO—, —OOC—, —CONR²—, —NR²CO— and —CO— bonded to carbon atoms on both sides, $R^2$ is a hydrogen atom or a radical R, X is a radical from the group consisting of —N=N—, —O—O—, —S—S— and —C(C₆H₅)₂—C(C₆H₅)₂—, a has the values 0, 1 or 2 and b has the values 0 or 1, with the proviso that the sum of the units of formulae (3) and (4) is at least 0.5% by weight of the total weight of the particles.

Examples of unsubstituted radicals R are alkyl radicals, such as the methyl, ethyl, n-propyl, iso-propyl, n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl, allyl, n-5-hexenyl, 4-vinylcyclohexyl and the 3-norbornenyl radical; cycloalkyl radicals, such as cyclopentyl, cyclohexyl, 4-ethylcyclohexyl and cycloheptyl radicals, norbornyl radicals and methylcyclohexyl radicals; aryl radicals, such as the phenyl, biphenylyl, naphthyl, anthryl and phenanthryl radicals; alkaryl radicals, such as o-, m- and p-tolyl radicals, xylyl radicals and ethylphenyl radicals; aralkyl radicals, such as the benzyl radical and the α and the β-phenylethyl radical, and the fluorenyl radical.

Examples of substituted hydrocarbon radicals as the radical R are halogenated hydrocarbon radicals, such as the chloromethyl, 3-chloropropyl, 3-bromopropyl, 3,3,3-trifluoropropyl and 5,5,5,4,4,3,3-heptafluoropentyl radical and the chlorophenyl, dichlorophenyl and trifluorotolyl radical; mercaptoalkyl radicals, such as the 2-mercaptoethyl and 3-mercaptopropyl radicals; cyanoalkyl radicals, such as the 2-cyanoethyl and 3-cyanopropyl radicals; aminoalkyl radicals, such as the 3-aminopropyl, N-(2-aminoethyl)-3-aminopropyl- and N-(2-aminoethyl)-3-amino-(2-methyl) propyl radicals; aminoaryl radicals, such as the aminophenyl radicals; quaternary ammonium radicals; acryloxyalkyl radicals, such as the 3-acryloxypropyl and 3-methacryloxypropyl radical; hydroxyalkyl radicals, such as the hydroxypropyl radical; phosphonic acid radicals; phosphonate radicals and sulfonate radicals, such as the 2-diethoxyphosphonato-ethyl or the 3-sulfonato-propyl radical.

The radical R preferably comprises unsubstituted and substituted $C_1$- to $C_6$-alkyl radicals, hydrogen and the phenyl radical, in particular the methyl, phenyl, vinyl, allyl, methacryloxypropyl, 3-chloropropyl, 3-mercaptopropyl, 3-aminopropyl and the (2-aminoethyl)-3-aminopropyl radical, hydrogen and quaternary ammonium radicals.

Examples of divalent hydrocarbon radicals $R^1$ are saturated alkylene radicals, such as the methylene and ethylene radical, and propylene, butylene, pentylene, hexylene, cyclohexylene and octadecylene radicals, or unsaturated alkylene or arylene radicals, such as the hexenylene radical and phenylene radicals, and, in particular, radicals of the formulae $$-(CH_2)_3N(R^3)-C(O)-(CH_2)_2-C(CN)(CH_3)- \qquad (6),$$

in which $R^3$ is a hydrogen atom or a methyl or cyclohexyl radical, and $$-(CH_2)_3-O-C(O)-(CH_2)_2-C(O)- \qquad (7).$$

Preferred radicals X are —N=N— and —O—O—.

Preferred units of the formula (5) fall under the formula (8)

$$[(CH_3)_aSi(O_{(3-a)/2})-(CH_2)_3-N(R^3)-C(O)-(CH_2)_2-C(CN)(CH_3)-N=]hd 2$$

in which a is 0, 1, or 2 and $R^3$ has the above meaning.

Preferably, the organopolysiloxane particles contain
1 to 80.0% by weight of units of the formula (1),
0 to 98.0% by weight of units of the formula (2),
0 to 99.0% by weight of units of the formula (3),
0 to 50.0% by weight of units of the formula (4) and,
0 to 10.0% by weight of units of the formula (5),
with the proviso that the sum of units of the formulae (3) and (4) is at least 1% by weight of the total weight of the particles.

In particular, the organopolysiloxane particles contain
5 to 70.0% by weight of units of the formula (1),
0 to 94.0% by weight of units of the formula (2),
1 to 95.0% by weight of units of the formula (3),
0% by weight of units of the formula (4) and,
0 to 5.0% by weight of units of the formula (5).

The present invention relates to a process for the preparation of crosslinked organopolysiloxane particles consisting of a single molecule, in which, in a first step, by metering silanes of the formula

$$R_cSi(OR^4)_{4-c} \qquad (9),$$

and, optionally, organosilicon compounds of the formula

$$R_d(R^4O)_eSiO_{(4-d-e)/2} \qquad (10),$$

and, optionally, organosilicon compounds of units of the formula

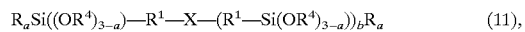
$$R_aSi((OR^4)_{3-a})-R^1-X-(R^1-Si(OR^4)_{3-a}))_bR_a \qquad (11),$$

in which $R^4$ has the meanings of R, c has the values 0, 1, 2 or 3, d and e independently of one another have the values 0, 1, 2, 3 or 4 and R, X, a and b have the above meanings, to an agitated mixture of emulsifier and water, forming a colloidal suspension of organopolysiloxane particles and in a second step, an organosilicon compound of the formula

$$(R^5_3Si)_fY^1 \qquad (12),$$

in which $Y^1$, if f=1, is a hydrogen atom, —$OR^6$, —$ONR^6_2$ or —$OOCR^6$ and if f=2, is —O— or —S—, $R^5$ and $R^6$ have the meaning of R and f has the values 1 or 2, with the proviso that the organosilicon compounds of formula (12) are water-soluble or hydrolyze in water to give a water-soluble compound, is added to the colloidal suspension.

Interparticle condensation of the organopolysiloxane particles is prevented by saturating the groups capable of condensation which remain after the first step with organosilicon compounds containing exclusively monofunctional triorganosilyl groups of formula (12) in step two.

Preferably, no by-products, such as hydrochloric acid or ammonia which increase the ionic strength of the aqueous colloidal system, are formed in the hydrolysis or condensation reaction of the organosilicon compounds of formula (12). Organosilicon compounds of formula (12) which are preferably employed are trimethylmethoxysilane, trimethylethoxysilane, hexamethyldisiloxane, vinyldimethylmethoxysilane, vinyldimethylethoxysilane, 1,1,3,3-tetramethyldisiloxane and mixtures thereof.

When the second reaction step has ended, the organopolysiloxane particles can be isolated from the colloidal suspensions by known processes, for example by coagulation of the latices by means of addition of salt or by addition of polar solvents.

After isolation in an optional third step, an organosilicon compound of formulae (13) and/or (14)

$$(R_3^5Si)_fY^2, \qquad (13)$$

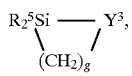

$$R_2^5Si \underset{(CH_2)_g}{\overset{\diagdown \qquad \diagup}{\relbar\joinrel\relbar Y^3,}} \qquad (14)$$

in which $Y^2$, if f=1, is hydrogen or halogen atoms, $-OR^6$, $-NR^6_2$, $-ONR^6_2$ or $-OOCR^6$ and if f=2, is $-O-$, $-N(R^6)-$ or $-S-$, $Y^3$ is the radicals $-O-$, $-N(R^6)-$ or $-S-$, g has values from 1 to 30, in particular 2, 3 or 4, and f, $R^5$ and $R^6$ have the above meanings, is added, in an aprotic solvent, to organopolysiloxane particles which contain more than about 15% by weight in total of units of formulae (3) and (4).

Organosilicon compounds of formula (13) are preferably employed in the third step.

Organosilicon compounds of formula (13) which are particularly preferred in this third reaction step are trimethylchlorosilane, dimethylchlorosilane, vinyldimethylchlorosilane, hexamethyldisilazane, 1,3-divinyl-1,1,3,3-tetramethyldisilazane or mixtures of disilazanes or chlorosilanes.

The amounts of compounds of formulae (9) to (14) employed are chosen such that the desired organopolysiloxane particles are obtained. The amounts of compounds of formulae (9) to (11) used are incorporated quantitatively in the first reaction step and control the degree of crosslinking of the organopolysiloxane particles in aqueous suspension. The compounds of formulae (12), (13) and (14) used in the second and, optionally, in the third reaction step are used in excess and are not incorporated completely into the organopolysiloxane particles. Preferably, 0.2 to 10, in particular 0.5 to 3 parts by weight of compounds of formula (12), in the second reaction step, or of the total of the compounds of formulae (12), (13) and (14) in the second and third reaction step, are used per part by weight of compounds of formulae (9) to (11).

If a third reaction step is carried out, the ratio of the amount of compounds of formulae (12) used in the second reaction step to the amount of compounds of formulae (13) and (14) used in the third reaction step is preferably 1:10 to 2:1, in particular 1:5 to 1:1.

The radical $R^6$ comprises unsubstituted C1- to C6-alkyl radicals and the phenyl radical, methyl, ethyl and propyl radicals being preferred.

Suitable emulsifiers are alkylsulfates, for example having a chain length of 8–18 C-atoms, or aryl and alkyl ethersulfates having 8–18 C-atoms in the hydrophobic radical and 1–40 ethylene oxide (EO) or propylene oxide (PO) units;

Sulfonates, for example alkylsulfonates having 8–18 C-atoms, alkylarylsulfonates, having 8–18 C-atoms or esters and half-esters of sulfosuccinic acid with monohydric alcohols or alkylphenols having 4–15 C atoms; optionally, these alcohols or alkylphenols can also be ethoxylated with 1–40 EO units;

alkali metal and ammonium salts of carboxylic acids having 8–20 C-atoms in the alkyl, aryl, alkaryl or aralkyl radicals;

phosphoric acid partial esters and alkali metal and ammonium salts thereof, for example alkyl and alkarylphosphates having 8–20 C-atoms in the organic radical, or alkyl ether- or alkaryl ether phosphates having 8–20 C-atoms in the alkyl or alkaryl radical and 1–40 EO units;

alkyl polyglycol ethers having 2–40 EO units and alkyl radicals of 4–20 C-atoms;

alkylaryl polyglycol ethers having 2–40 EO units and 8–20 C-atoms in the alkyl and aryl radicals;

ethylene oxide/propylene oxide (EO/PO) block copolymers having 8–40 EO or PO units;

fatty acid polyglycol esters having 6–24 C atoms and 2–40 EO units;

alkyl polyglycosides, naturally occurring substances and derivatives thereof, such as lecithin, lanolin, saponins and cellulose; and cellulose alkyl ethers and carboxyalkylcelluloses, the alkyl groups of up to 4 carbon atoms;

linear organo(poly)siloxanes which contain polar groups and have alkoxy groups having up to 24 C-atoms and/or up to 40 EO and/or PO groups;

salts of primary, secondary and tertiary fatty amines having 8–24 C-atoms with acetic acid, sulfuric acid, hydrochloric acid and phosphoric acids;

quaternary ammonium salts, such as halides, sulfates, phosphates, acetates or hydroxides, the alkyl groups of which independently of one another have 1–24 C-atoms; optionally, the alkyl or alkaryl or aralkyl groups of the quaternary ammonium compounds can also be partly ethoxylated (1–40 EO units);

alkylpyridinium, alkylimidazolinium and alkyloxazolinium salts, the alkyl chain of which has up to 18 C-atoms, in the form of their halides, sulfates, phosphates or acetates.

Benzenesulfonic acids with aliphatic substituents and salts thereof, and optionally partly ethoxylated quaternary ammonium halides and hydroxides are preferred. Dodecylbenzenesulfonic acid and benzyldimethyl-{2-[2-(p-1,1,3,3-tetramethylbutyl-phenoxy)-ethoxy]-ethyl}-ammonium chloride (benzethonium chloride) are more preferred.

The amount of emulsifier to be employed is 0.5–50% by weight, preferably 1.0–30% by weight, based on the amount of organosilicon starting compounds used in total in the first and second reaction step. The organosilicon starting compounds of formulae (9) to (11) preferably are metered in during the first reaction step. Preferably, all the starting components of formulae (9) to (11) are mixed in the desired ratio before metering during the first reaction step; in order to obtain a homogeneous mixture, optionally, 0.1–30% by weight, based on the sum of the starting components of formulae (9) to (11), of an alkanol of the formula $R^7OH$, in which $R^7$ is an alkyl radical having 1 to 5 carbon atoms, is added as a solubilizing agent, the alkanols methanol and ethanol being more preferred.

Aprotic organic solvents which are used in the third step are the above mentioned ethers, hydrocarbons, ketones and organopolysiloxanes, in particular tetrahydrofuran, cyclohexane, methylcyclohexane or toluene. The reaction both in the first (emulsion poly-condensation/polymerization) and in the second reaction step is carried out at 5°–95° C., in particular at 10°–85° C., and more preferably at 10°–40° C. The pH is 1–12, preferably 1–4 or 7–11, depending on the acid/base stability of the radicals R, $R^4$, $R^5$ and $R^6$ of the starting compounds (9) to (12).

In the preparation of the colloidal suspensions during the first reaction step, it is advantageous for the stability of the emulsion if, after the end of metering of the organosilicon starting compounds of formulae (9) to (11), the mixture is stirred for a further 1 to 24 hours. The alkanol liberated during the hydrolysis can be removed by distillation, optionally under reduced pressure, although this is not preferred. The solids content of the colloidal suspension prepared by the first step should be not more than 25% by weight, since a high increase in the viscosity makes the further reaction more difficult. In the reaction of the colloidal suspension with an organosilicon compound of formula (12) in the second reaction step, to achieve a reaction which is as complete as possible it is advantageous if the mixture is stirred for a further 1 to 48 hours after the end of the addition of compounds of formula (12).

The reaction with organosilicon compound of formulae (13) and (14) in the third reaction step is carried out at 5°–95° C., in particular at 10°–85° C., and more preferably at 10°–40° C. To achieve a reaction which is as complete as possible, it is again advantageous if the mixture is stirred for a further 1–24 hours after the end of the addition of the compound of formulae (13) and (14).

Static and dynamic light scattering are suitable for structural characterization of the organopolysiloxane particles. Static and dynamic light scattering are established methods known to the expert in macromolecular chemistry and colloidal chemistry for characterizing disperse particles. In static light scattering, the scattering intensity is determined at various angles over a sufficiently long interval of time to provide information on the static properties of the macromolecules, such as the weight-average molecular weight $M_w$, the z-average of the square of the radius of gyration $<Rg^2>_z$ and the second virial coefficient $A_2$, which describes the intra- and intermolecular thermodynamic interactions of the dispersed particles with the solvent. In contrast to static light scattering, in dynamic light scattering the fluctuation of the scattered light intensity as a function of time is observed. This leads to information on the dynamic properties of the molecules investigated. The z-average of the diffusion coefficient $D_z$ and therefore, via the Stokes-Einstein law, the hydrodynamic radius $R_h$ and the coefficient $k_d$, which describes the dependence of the diffusion coefficient on the concentration, are measured.

From the angular dependence of the scattered light, the particle shape can be determined and any structuring present in the solution clarified. Simultaneous static and dynamic light scattering measurement allows the abovementioned conclusions of the system investigated to be drawn, and information, for example, on particle size, dispersity and shape, and on molecular weight and density to be obtained, with a single experiment. This is described, for example, in M. Schmidt, Simultaneous Static and Dynamic Light Scattering: Applications to Polymer Structure Analysis, in: Dynamic Light Scattering: The Method and some Applications; Brown, W. (Editor); Oxford University Press, Oxford, UK 372–406 (1993).

The quotient of the radius of gyration and the hydrodynamic radius, the so-called ρ ratio, provides structural information on the particle shape, such as hard spheres, hollow spheres, tangles, rods or star-shaped polymers. For the "hard spheres" particle shape, the theoretical ρ ratio is 0.775; the values measured for the preferred organopolysiloxane particles are from 0.775 to not more than ρ=1.0. The preferred organopolysiloxane particles are therefore spherical.

The size range of the organopolysiloxane particles represents the limiting range between large molecules, oligomers and dendrimers on the one hand and small solids on the other hand, and thus corresponds to a boundary between a solid and a molecule. On the one hand, collective properties of solids have not yet developed, and on the other hand molecular properties are no longer to be observed or can be observed only approximately. Examples of particulate structures of this order of size having a virtually fixed conformation are microgels. According to Antonietti (Angew. Chemie 100 (1988) 1813–1817) microgels obtained from aqueous colloidal systems and having particle diameters in the mesoscopic size range of 5 to 200 nm and molecular weights of $10^6$ to $10^{11}$ (g/mol) are called "Type B" microgels. "Type B" microgels are of particular interest, for example, as fillers or agents which impart compatibility for (optically transparent) polymers or as potential starting materials for tailor-made catalyst systems.

The organopolysiloxane particles are suitable as additives for polymer modification. Soft elastic particles can be used as impact modifiers, and hard particles as fillers. By incorporation of reactive groups, such as vinyl, allyl or methacrylate, the organopolysiloxane particles can be used as reactive fillers or reactive modifiers which are bonded chemically to the matrix and greatly influence the mechanical properties of the surrounding polymer matrix. Furthermore, particulate graft copolymers comprising a siloxane core and organopolymer shell can be built up in a controlled manner in secondary reactions from the organopolysiloxane particles having olefinic groups or azo functions. Hydridofunctional organopolysiloxane particles can be reacted by subsequent hydrosilylation reactions and further functionalized; alternatively—as is the case with vinyl- or allyl-functional organopolysiloxane particles—they can be employed in hydrosilylation reactions as reinforcing or elastic particles which are crosslinked in.

In the following examples, unless stated otherwise in each case,
a) all the amounts data are based on the weight;
b) all the pressures are 0.10 MPa (absolute);
c) all the temperatures are 20° C.

EXAMPLE

Light Scattering

Static and dynamic light scattering were measured with a unit which comprises, inter alia, a Stabilite™ 2060-lls Kr laser from Spectra-Physics, a goniometer Sp-86 from ALV and an ALV-3000 Digital Structurator/Correlator. The krypton ion laser operated at a wavelength of 647.1 nm.

Sample preparation: the samples (organopolysiloxane particles in toluene; the particular concentration range is stated in the examples) were filtered three times through Millex™-FGS filters (0.2 μm pore size) from Millipore. The measurement temperature in the light scattering experiments was 20° C. The dynamic light scattering measurements were carried out as a function of the angle from 50° to 130° in 20° steps, and the correlation functions were evaluated with the Simplex Algorithm. In the static light scattering experiment, the angular dependence of the scattered light was measured from 30° to 140° in 5° steps.

Example 1

25.0 g of methyltrimethoxysilane were metered into an initial mixture of 125 g of water, 3 g of benzethonium chloride and 0.3 g of sodium hydroxide solution (10% strength in water) in the course of 45 minutes, while stirring. After the mixture had been stirred for a further 5 hours, 1.2 g of trimethylmethoxysilane were added to 25 g of the resulting suspension, while stirring, and the mixture was stirred for a further 10 hours. The suspension was broken by addition of 50 ml of methanol. The solid which had precipitated out was filtered off, washed 3 times with 30 ml of methanol and taken up in 50 ml of toluene. After addition of 1.6 g of hexamethyldisilazane and stirring for 10 hours, the product was precipitated out with 150 ml of methanol, filtered off and dried under a high vacuum. 1.2 g of a white powder having the relative composition $[(CH_3)_3SiO_{1/2}]_{1.38}$ $[CH_3SiO_{3/2}]_{1.0}$ were obtained. A hydrodynamic particle radius $R_h$ of 10.0 nm and a radius of gyration $R_g$ of <10 nm was determined by means of static and dynamic light scattering (solvent toluene; concentration range of the measurement: 0.5–2 g/l). This gives a ρ ratio of <1.0. The molecular weight $M_w$ of the monodisperse spherical particles was determined as $2.0 \times 10^6$. The organopolysiloxane particles are readily soluble in toluene, pentane, cyclohexane, dimethylformamide, tetrahydrofuran, dioxane, diethyl ether, methyl methacrylate, styrene and poly(dimethylsiloxane) of viscosity 35 mPa.s.

Example 2

A mixture of 13.3 g of methyltrimethoxysilane and 11.7 g of dimethyldimethoxysilane was metered into an initial mixture of 125 g of water, 3 g of benzethonium chloride and 0.3 g of sodium hydroxide solution (10% strength in water) in the course of 1 hour, while stirring. After the mixture had been stirred for a further 10 hours, 1.2 g of trimethylmethoxysilane were added to 25 g of the resulting suspension, while stirring, and the mixture was stirred for a further 10 hours. The suspension was broken by addition of 50 ml of methanol. The solid which had precipitated out was filtered off, washed 3 times with 30 ml of methanol and taken up in 50 ml of toluene. After addition of 1.6 g of hexamethyldisilazane and stirring for 10 hours, the product was precipitated out with 150 ml of methanol, filtered off and dried under a high vacuum. 2.0 g of a white powder built up from $[(CH_3)_3SiO_{1/2}]$-, $[(CH_3)_2SiO_{2/2}]$- and $[CH_3SiO_{3/2}]$-units were obtained. A hydrodynamic particle radius $R_h$ of 11.7 nm and a radius of gyration $R_g$ of <10 nm was determined by means of static and dynamic light scattering (solvent toluene; concentration range of the measurement: 0.05–2 g/l). This gives a ρ ratio of <0.85. The molecular weight $M_w$ of the monodisperse, spherical particles was determined as $2.0 \times 10^6$. The organopolysiloxane particles are readily soluble in toluene, tetrahydrofuran, chloroform, cyclohexane, pentane and methyl methacrylate.

Example 3

A mixture of 8.2 g of methyltrimethoxysilane and 16.8 g of dimethyldimethoxysilane was metered into an initial mixture of 125 g of water, 3 g of benzethonium chloride and 0.3 g of sodium hydroxide solution (10% strength in water) in the course of 1 hour, while stirring. The subsequent procedure was as in Example 2. 1.7 g of a white powder built up from $[(CH_3)_3SiO_{1/2}]$-, $[(CH_3)_2SiO_{2/2}]$- and $[CH_3SiO_{3/2}]$-units were obtained. A hydrodynamic particle radius $R_h$ of 17.3 nm and a radius of gyration $R_g$ of 13.7 nm was determined by means of static and dynamic light scattering (solvent toluene; concentration range of the measurement: 0.05–2 g/l). This gives a ρ-ratio of 0.79. The molecular weight $M_w$ of the monodisperse, spherical particles was determined as $5.13 \times 10^6$. The poly(organosiloxane) particles are readily soluble in toluene, tetrahydrofuran, chloroform, cyclohexane, pentane and methyl methacrylate.

Example 4

A mixture of 2.8 g of methyltrimethoxysilane and 22.2 g of dimethyldimethoxysilane was metered into an initial mixture of 125 g of water, 3 g of benzethonium chloride and 0.3 g of sodium hydroxide solution (10% strength in water) in the course of 1 hour, while stirring, 1.0 g of trimethylmethoxysilane was added to 25 g of the resulting suspension, while stirring, and the mixture was stirred for a further 48 hours. The suspension was broken by addition of 50 ml of methanol. The solid which had precipitated out was filtered off, washed 3 times with 30 ml of methanol and taken up in a little toluene. The product was precipitated out with methanol, filtered off and dried under a high vacuum. 1.5 g of a white, rubber-elastic powder built up from $[(CH_3)_3SiO_{1/2}]$-, $[(CH_3)_2SiO_{2/2}]$- and $[CH_3Sio_{3/2}]$-units were obtained. A hydrodynamic particle radius $R_h$ of 24.5 nm and a radius of gyration $R_g$ of 21.3 nm was determined by means of static and dynamic light scattering (solvent toluene; concentration range of the measurement: 0.05–2 g/l). This gives a ρ-ratio of 0.87. The molecular weight $M_w$ of the monodisperse spherical particles was determined as $5.70 \times 10^6$. The organopolysiloxane particles are readily soluble in toluene, tetrahydrofuran, chloroform, cyclohexane, pentane and methyl methacrylate.

Example 5

A mixture of 1.4 g of methyltrimethoxysilane and 23.6 g of dimethyldimethoxysilane was metered into an initial mixture of 125 g of water, 3 g of benzethonium chloride and 0.3 g of sodium hydroxide solution (10% strength in water) in the course of 1 hour, while stirring. The subsequent procedure was as in Example 4. 1.8 g of a white, rubber-elastic powder built up from $[(CH_3)_3SiO_{1/2}]$-, $[(CH_3)_2SiO_{2/2}]$- and $[CH_3Sio_{3/2}]$-units were obtained. A hydrodynamic particle radius $R_h$ of 32.0 nm and a radius of gyration $R_g$ of 28.5 nm was determined by means of static and dynamic light scattering (solvent toluene; concentration range of the measurement: 0.05–2 g/l). This gives a ρ ratio of 0.85. The molecular weight $M_w$ of the monodisperse spherical particles was determined as $6.50 \times 10^6$. The organopolysiloxane particles are readily soluble in toluene, tetrahydrofuran, chloroform, cyclohexane and pentane.

Example 6

22.0 g of methyltrimethoxysilane were metered into an initial mixture of 125 g of water, 2.5 g of benzethonium chloride and 0.3 g of sodium hydroxide solution (10% strength in water) in the course of 45 minutes, while stirring. After the mixture had been stirred for 3 hours, 3.0 g of vinyltrimethoxysilane were added in the course of 30 minutes, while stirring, and the mixture was stirred for a further 10 hours. 1.34 g of vinyldimethylmethoxysilane were added to 25 g of the resulting suspension, while stirring, and the mixture was stirred for a further 10 hours. The suspension was broken by addition of 50 ml of methanol. The solid which had precipitated out was filtered off, washed 3 times with 30 ml of methanol and taken up in 50 ml of toluene. After addition of 1.73 g of 1,3-divinyl-1,1,3,3-tetramethyldisilazane and stirring for 10 hours, the product was precipitated out with 150 ml of methanol, filtered off and dried under a high vacuum. 2.3 g of a white powder of the relative composition $[(CH_3)_2(H_2C=CH)SiO_{1/2}]_{1.20}[(H_2C=CH)SiO_{3/2}]_{0.11}[CH_3SiO_{3/2}]_{0.89}$ were obtained. A hydrodynamic particle radius $R_h$ of 11.9 nm and a radius of gyration $R_g$ of 10 nm was determined by means of static and dynamic light scattering (solvent toluene; concentration range of the measurement: 1.0–2.5 g/l). This gives a ρ-ratio of 0.84. The molecular weight $M_w$ of the monodisperse spherical particles was determined as $2.0 \times 10^6$. The incorporation of olefinic vinyl groups was detected qualitatively by IR spectroscopy (KBr pellet, $v_{C=C}$ 1602 cm$^{-1}$) and by $^1$H-NMR spectroscopy (CDCl$_3$, δ (CH=CH$_2$) 5.1–6.5 ppm). The organopolysiloxane particles are readily soluble in toluene, pentane, cyclohexane, dimethylformamide, tetrahydrofuran, dioxane, diethyl ether, methyl methacrylate, styrene and poly(dimethylsiloxane) of viscosity 35 mPa.s.

Example 7

15.0 g of triethoxysilane were metered into an initial mixture of 125 g of water and 10 g of a solution of 10 parts of dodecylbenzenesulfonic acid, 0.75 part of sodium hydroxide and 100 parts of water in the course of 45 minutes, while stirring. After the mixture had been stirred for 10 hours, 1.0 g of 1,1,3,3-tetramethyldisiloxane were added to 25 g of the resulting suspension, while stirring, and the mixture was stirred for a further 48 hours. The suspension was broken by addition of 50 ml of methanol. The solid which had precipitated out was filtered off, taken up in 40 ml of acetone, precipitated out again by addition of 200 ml of methanol and filtered off. After the solid had been taken up in tetrahydrofuran, 5 g of trimethylchlorosilane were added under nitrogen. After the mixture had been stirred for 10 hours, all the volatile constituents were removed and the residue was taken up in 40 ml of petroleum ether (boiling range 40°–60° C.). The product was precipitated out by addition of 40 ml of methanol, filtered off and dried under a high vacuum. 2.5 g of a white powder built up from $[(CH_3)_2HSiO_{1/2}]$-, $[(CH_3)_3SiO_{1/2}]$- and $[HSiO_{3/2}]$-units were obtained. A hydrodynamic particle radius $R_h$ of 9.5 nm and a radius of gyration $R_g$ of <10 nm was determined by means of static and dynamic light scattering (solvent toluene; concentration range of the measurement: 1.0–3.0 g/l). The molecular weight $M_w$ of the monodisperse spherical particles was determined as $1.6 \times 10^6$. The incorporation of the Si—H functions was detected qualitatively by IR spectroscopy (KBr pellet, $v_{Si-H}$ 2238 cm$^{-1}$) and by $^1$H-NMR spectroscopy (CDCl$_3$, δ Si—H 4.0–5.5 ppm). The organopolysiloxane particles are readily soluble in toluene, pentane, cyclohexane, tetrahydrofuran, dioxane, diethyl ether and poly-(dimethylsiloxane) having a viscosity of 35 mPa.s.

Example 8

22.0 g of methyltrimethoxysilane were metered into an initial mixture of 125 g of water, 2.5 g of benzethonium chloride and 0.3 g of sodium hydroxide solution (10% strength in water) in the course of 45 minutes, while stirring. After the mixture had been stirred for 5 hours, a mixture of 0.25 g of $[(C_2H_5O)_3Si—(CH_2)_3—N(CH_3)—C(O)—(CH_2)_2—C(CN)(CH_3)—N=]_2$ $[(C_2H_5O)_3Si\text{-azo-}Si(C_2H_5O)_3]$ and 2.75 g of methyltrimethoxysilane was added in the course of 30 minutes, while stirring, and the mixture was stirred for a further 10 hours. 1.2 g of trimethylmethoxysilane were added to 25 g of the resulting suspension, while stirring, and the mixture was stirred for a further 10 hours. The suspension was broken by addition of 50 ml of methanol. The solid which had precipitated out was filtered off, washed 3 times with 30 ml of methanol and taken up in 50 ml of tetrahydrofuran. After addition of 1.6 g of hexamethyldisilazane and stirring for 10 hours, the product was precipitated out with 150 ml of methanol, filtered off and dried under a high vacuum. 1.2 g of a white powder having the relative composition $[(CH_3)_3SiO_{1/2}]_{1.20}[CH_3SiO_{3/2}]_{1.0}[O_{3/2}Si\text{-azo-}SiO_{3/2}]_{0.002}$ units were obtained. A hydrodynamic particle radius $R_h$ of 9.8 nm and a radius of gyration $R_g$ of <10 nm was determined by means of static and dynamic light scattering (solvent toluene; concentration range of the measurement: 1.0–2.5 g/l; measurement after conditioning of the sample at 75° C. for 48 hours). This gives a ρ ratio of <1.0. The molecular weight $M_w$ of the monodisperse spherical particles was determined as $0.86 \times 10^6$. Incorporation of the azo-functional silane was detected qualitatively and quantitatively by DSC measurements. The organopolysiloxane particles are readily soluble in toluene, pentane, cyclohexane, tetrahydrofuran, dioxane and methyl methacrylate.

Comparison Example 1

25.0 g of methyltrimethoxysilane were metered into an initial mixture of 125 g of water, 3 g of benzethonium chloride and 0.3 g of sodium hydroxide solution (10% strength in water) in the course of 45 minutes, while stirring, analogously to Example 1. After the mixture had been stirred for a further 5 hours, 25 g of the resulting suspension were broken by addition of 50 ml of methanol. The solid which had precipitated out was filtered off and washed 3 times with 30 ml of methanol. It proved to be insoluble in toluene and could not be further reacted and characterized.

Comparison Example 2

A mixture of 19.5 g of methyltrimethoxysilane and 5.5 g of trimethylmethoxysilane was metered into an initial mixture of 125 g of water, 3 g of benzethonium chloride and 0.3 g of sodium hydroxide solution (10% strength in water) in the course of 60 minutes, while stirring. After the mixture had been stirred for a further 10 hours, 25 g of the resulting suspension were broken by addition of 50 ml of methanol. The solid which had precipitated out was filtered off and washed 3 times with 30 ml of methanol. It proved to be insoluble in toluene and could not be further reacted and characterized.

Comparison Example 3

A mixture of 14.0 g of methyltrimethoxysilane and 11.0 g of trimethylmethoxysilane was metered into an initial mixture of 125 g of water, 3 g of benzethonium chloride and 0.3 g of sodium hydroxide solution (10% strength in water) in the course of 90 minutes, while stirring. After the mixture had been stirred for a further 15 hours, 25 g of the resulting suspension were broken by addition of 50 ml of methanol. A highly viscous oil was obtained.

What is claimed is:

1. Crosslinked organopolysiloxane particles where each particle is a single molecule, comprising;

0.5 to 80.0% by weight of units of the formula $$R_3SiO_{1/2} \qquad (1),$$

0 to 99.0% by weight of units of the formula $$R_2SiO_{2/2} \qquad (2),$$

0 to 99.5% by weight of units of the formula $$RSiO_{3/2} \qquad (3),$$

0 to 80.0% by weight of units of the formula $$SiO_{4/2} \qquad (4)$$

and 0 to 20.0% by weight of units of the formula $$R_aSi(O_{(3-a)/2})—R^1—X—(R^1—Si(O_{(3-a)/2}))_bR_a \qquad (5),$$

where

R is a hydrogen atom or identical or different, monovalent SiC-bonded, optionally substituted $C_1$ to $C_{18}$-hydrocarbon radical, $R^1$ is an identical or different divalent, optionally substituted $C_1$ to $Ch_{18}$-hydrocarbon radical, which is optionally interrupted by divalent radicals from the group consisting of —O—, —COO—, —OOC—, —CONR$^{2-}$, —NR$^2$CO— and —CO— bonded to carbon atoms on each side, $R^2$ is a hydrogen atom or a radical R, X is a radical selected from the group consisting of —N═N—, —O—O—, —S—S— and —C($C_6H_5$)$_2$—C($C_6H_5$)$_2$—, a has a value of 0, 1 or 2 and b has a value of 0 or 1, with the proviso that the sum of the units of formulae (3) and (4) is at least 0.5%, the percent by weight is based on the total weight of the particle and where at least 80% of the particles have a diameter which does not deviate from an average diameter of 5 to 200 nm by more than 30% and the particles are soluble in a solvent in an amount of at least 5% by weight.

2. Organopolysiloxane particles as claimed in claim 1, in which the average molecular weights $M_w$ are $10^5$ to $10^{10}$.

3. A process for the preparation of organopolysiloxane particles as claimed in claim 1, comprising;

in a first step,
   metering into an agitated mixture of emulsifier and water, a silane of the formula $$R_cSi(OR^4)_{4-c} \quad (9),$$

and, optionally organosilicon compounds of the formulae

$$R_d(R^4O)_eSiO_{(4-d-e)/2} \quad (10),$$

and/or

$$R_aSi((OR^4)_{3-a})—R^1—X—(R^1—Si(OR^4)_{3-a})_bR_a \quad (11),$$

in which $R^4$ is a hydrogen atom or identical or different monovalent, optionally substituted $C_1$ to $C_{18}$-hydrocarbon radical, c has a value of 0, 1, 2 or 3, d and e independent of one another, have the value of 0, 1, 2, 3 or 4, R is a hydrogen atom or identical or different monovalent SiC-bonded, optionally substituted $C_1$ to $C_{18}$-hydrocarbon radical, X is a radical selected from the group consisting of —N═N—, —O—O—, —S—S— and —C($C_6H_5$)$_2$—C($C_6H_5$)$_2$—, a has a value of 0, 1 or 2 and b has a value of 0 or 1, and forming a colloidal suspension of organopolysiloxane particles, and in a second step,
   saturating any groups capable of condensation which remain after the first step by adding an organosilicon compound of the formula

$$(R^5_3Si)_fY^1 \quad (12),$$

in which f has a value of 1 or 2, $Y^1$, is a hydrogen atom, —OR$^6$, —ONR$^6_2$ or —OOCR$^6$ if f=1, or —O— or —S— if f=2, and $R^5$ and $R^6$ have the meaning given for $R^4$ where the organosilicon compound of formula (12) is water-soluble or hydrolyzes in water to give a water-soluble compound, and after the completion of the second step the organopolysiloxane particles are optionally isolated from the collodial suspension.

4. The process as claimed in claim 3, in which an organosilicon compound of formulae (13) and/or (14)

$$(R_3^5Si)_fY^2, \quad (13)$$

$$R_2^5Si \overset{\diagdown}{\underset{(CH_2)_g}{\diagup}} Y^3, \quad (14)$$

in which $Y^2$ if f=1, is hydrogen or halogen atoms, —OR$^6$, —NR$^6_2$, —ONR$^6_2$ or —OOCR$^6$ and if f=2, is —O—, —N(R$^6$)— or —S—, $Y^3$ is the radicals —O—, —N(R$^6$)— or —S—, g has values from 1 to 30 and f, $R^5$ and $R^6$ have the above meanings, are added after the second step, in a third reaction step in an aprotic solvent, to organopolysiloxane particles which contain more than about 15% by weight in total of units of formulae (3) and (4).

* * * * *

UNITED STATES PATENT AND TRADEMARK OFFICE
CERTIFICATE OF CORRECTION

PATENT NO. : 5,854,369

DATED : December 29, 1998

INVENTOR(S) : MICHAEL GECK, et al.

It is certified that error appears in the above-identified patent and that said Letters Patent is hereby corrected as shown below:

Column 13, Line 2, Claim 1, delete "SiC-bonded".

Column 13, Line 6, Claim 1, after "divalent" insert --SiC-bonded--.

Signed and Sealed this

Eighteenth Day of May, 1999

*Attest:*

*Attesting Officer*

Q. TODD DICKINSON

*Acting Commissioner of Patents and Trademarks*